(12) United States Patent
Mirsky

(10) Patent No.: US 7,934,473 B2
(45) Date of Patent: May 3, 2011

(54) PET CARRIER ACCESS PORTAL

(76) Inventor: Jonathan Mirsky, Washington, DC (US)

(*) Notice: Subject to any disclaimer, the term of this patent is extended or adjusted under 35 U.S.C. 154(b) by 0 days.

(21) Appl. No.: 12/726,609

(22) Filed: Mar. 18, 2010

(65) Prior Publication Data

US 2011/0036301 A1    Feb. 17, 2011

Related U.S. Application Data

(63) Continuation of application No. 12/208,132, filed on Sep. 10, 2008, now Pat. No. 7,707,972, which is a continuation of application No. 11/080,320, filed on Mar. 15, 2005, now Pat. No. 7,438,022.

(51) Int. Cl.
*A01K 1/03* (2006.01)
*A01K 1/035* (2006.01)

(52) U.S. Cl. .................. 119/496; 119/497; 119/501

(58) Field of Classification Search .............. 119/496, 119/497, 501
See application file for complete search history.

(56) References Cited

U.S. PATENT DOCUMENTS

| | | | |
|---|---|---|---|
| 3,150,640 A | 9/1964 | Nevitt |
| 3,547,079 A | 12/1970 | Bassett |
| 3,941,092 A | 3/1976 | Winters |
| 4,269,149 A | 5/1981 | Thomas |
| 4,736,707 A | 4/1988 | Christie |
| 4,844,016 A | 7/1989 | Filosa |
| 4,852,520 A | 8/1989 | Goetz |
| 4,977,857 A | 12/1990 | Slawinski |
| 4,984,535 A | 1/1991 | White |
| 5,065,699 A | 11/1991 | Marshall |
| 5,113,793 A | 5/1992 | Leader et al. |
| D331,131 S | 11/1992 | Quillen |
| 5,170,745 A | 12/1992 | Burdette, Jr. |
| 5,230,304 A | 7/1993 | Santoro |
| 5,265,719 A | 11/1993 | Wand |
| RE034,517 E | 1/1994 | White |
| 5,291,857 A | 3/1994 | Braun, Jr. |
| 5,309,866 A | 5/1994 | Santoro |
| 5,503,107 A | 4/1996 | Satcher et al. |
| 5,636,594 A | 6/1997 | Pina |
| 5,664,524 A | 9/1997 | Piglia et al. |
| 5,671,698 A | 9/1997 | Farrugia |
| 5,678,509 A | 10/1997 | Dillon |
| 5,701,843 A | 12/1997 | Lazides |
| 5,769,028 A | 6/1998 | Deckys |
| 5,931,120 A | 8/1999 | Burns et al. |
| 6,082,305 A | 7/2000 | Burns et al. |
| 6,095,090 A | 8/2000 | Burns et al. |
| 6,131,534 A | 10/2000 | Axelrod |
| 6,196,161 B1 | 3/2001 | Thurber |
| 6,216,637 B1 | 4/2001 | Burns et al. |
| 6,216,638 B1 | 4/2001 | Pivonka et al. |
| 6,230,656 B1 | 5/2001 | Walach |
| 6,286,462 B1 | 9/2001 | Burns |
| 6,308,661 B2 | 10/2001 | Burns et al. |
| 6,354,245 B1 | 3/2002 | Roddy et al. |
| 6,394,036 B2 | 5/2002 | Burns et al. |
| 6,408,797 B2 | 6/2002 | Pivonka et al. |

(Continued)

*Primary Examiner* — Yvonne R. Abbott

(57) ABSTRACT

An access portal for a pet carrier allows a pet owner to insert a hand into the pet carrier but prevents the animal contained therein from escaping through the access portal. The access portal may be blocked by an elastic barrier with an aperture that stretches to allow the pet owner to gain access to the interior of the pet carrier. Doors covering the access portal on the inside and/or the outside of the carrier may also be used instead of, or in conjunction with the elastic barrier.

4 Claims, 9 Drawing Sheets

U.S. PATENT DOCUMENTS

| | | |
|---|---|---|
| 6,427,631 B1 | 8/2002 | Ross |
| 6,435,133 B1 | 8/2002 | Wayne, Jr. |
| 6,516,751 B2 | 2/2003 | Burns et al. |
| 6,523,499 B1 | 2/2003 | Chrisco et al. |
| 6,568,347 B2 | 5/2003 | Ciguere |
| 6,571,740 B1 | 6/2003 | Kinder et al. |
| 6,584,937 B1 | 7/2003 | Ludolph |
| 2002/0124808 A1 | 9/2002 | Zampelli et al. |
| 2006/0169218 A1* | 8/2006 | Chang .......................... 119/496 |

* cited by examiner

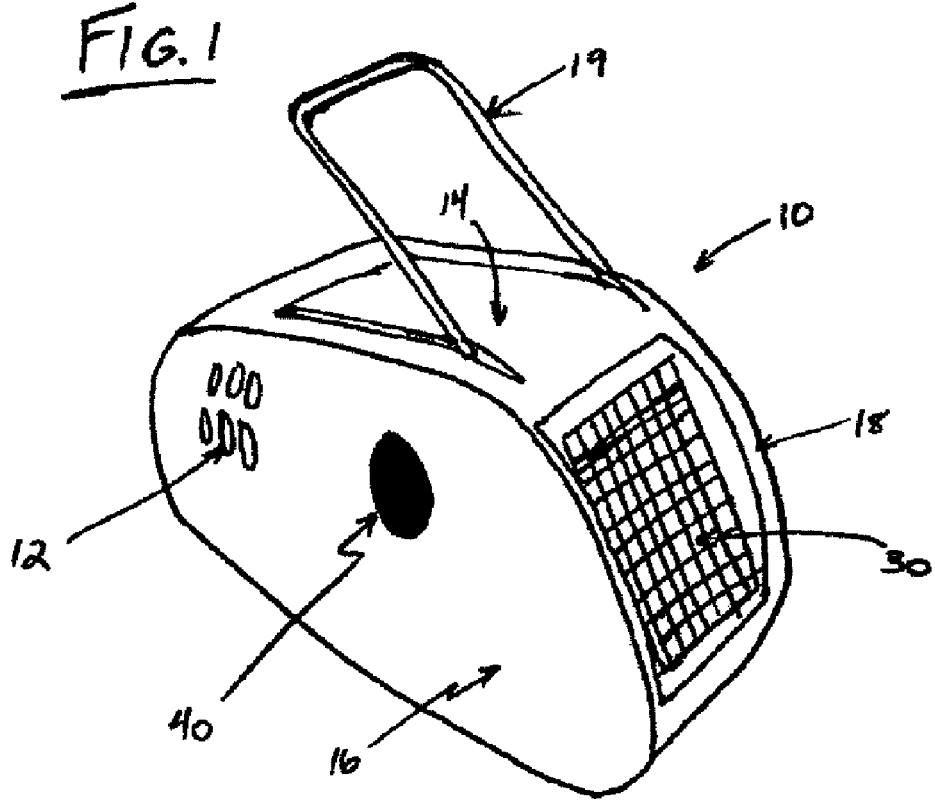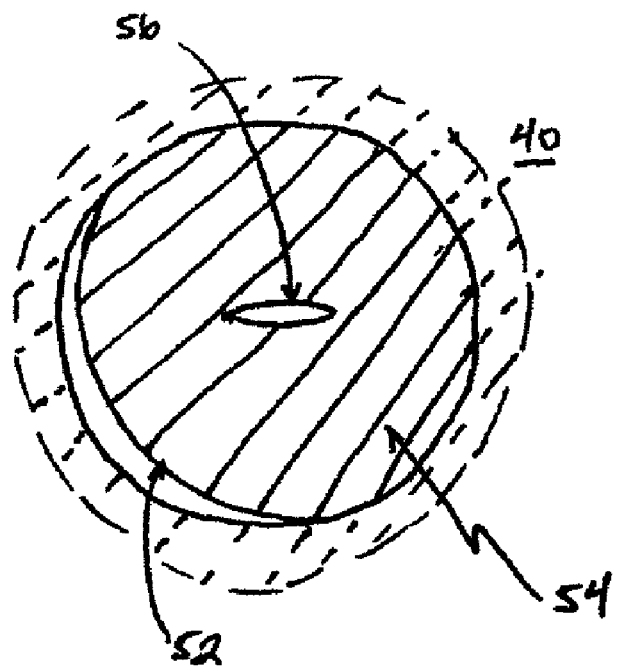

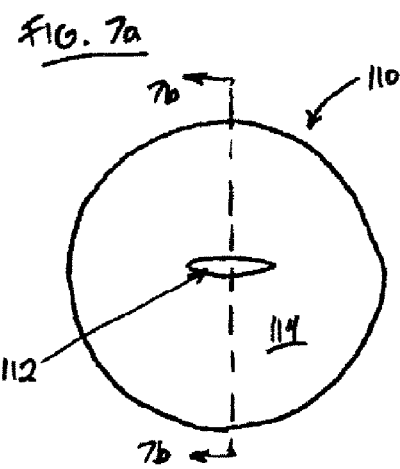
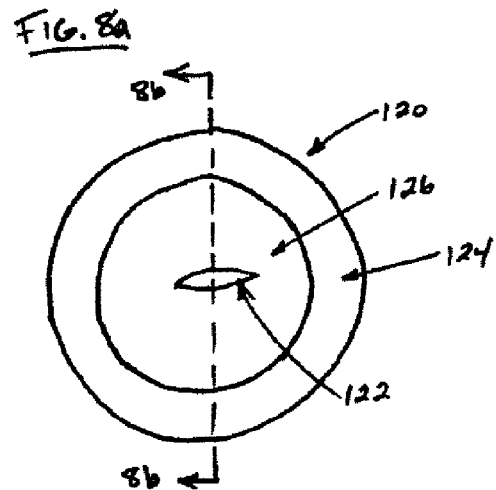
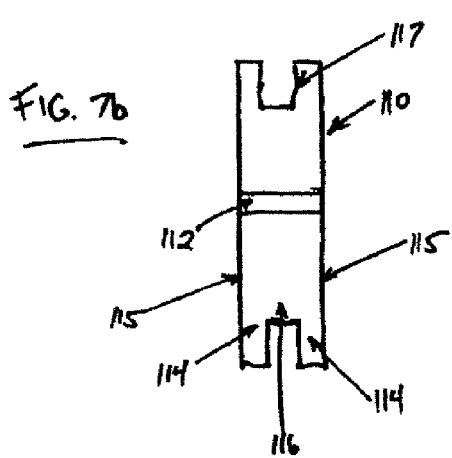
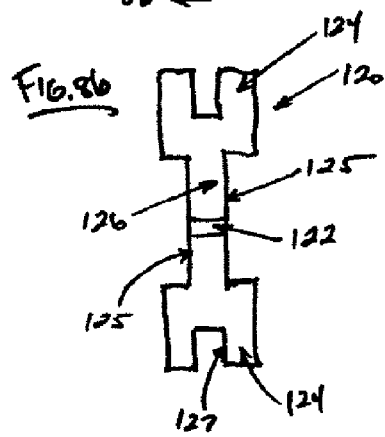
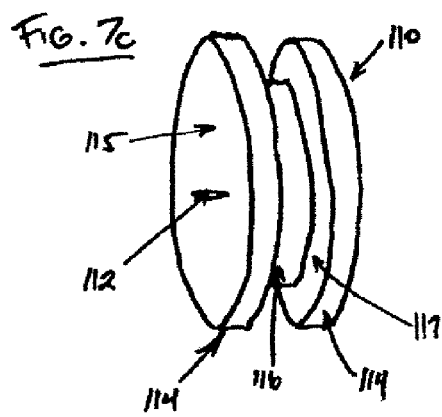
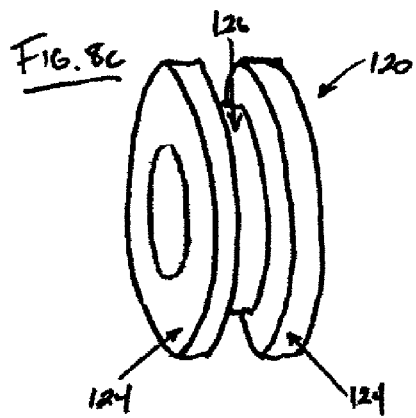

US 7,934,473 B2

PET CARRIER ACCESS PORTAL

This application is a continuation of U.S. application Ser. No. 12/208,132, filed Sep. 10, 2008, which is a continuation of U.S. application Ser. No. 11/080,320, filed Mar. 15, 2005, which issued as U.S. Pat. No. 7,438,022 on Oct. 21, 2008. Both U.S. application Ser. No. 11/080,320 and U.S. application Ser. No. 12/208,132 are incorporated in their entirety by reference herein.

FIELD OF THE INVENTION

The present invention relates generally to pet carriers. More specifically, the present invention relates to pet carriers with at least one access portal that allows a pet owner to extend a hand into the pet carrier, but prevents the pet from exiting the pet carrier.

BACKGROUND INFORMATION

Pet carriers of varying sizes, shapes, and designs are currently available. Some existing carrier designs include, for example, plastic, hard-shell boxes and large tote bags. Examples of pet carriers are described in U.S. Pat. Nos. 6,523,499, 5,931,120, and 3,547,079.

Although pet carriers may be used as kennels for animals, they are typically used to transport animals from point to point in private vehicles or public transportation vehicles, such as planes, buses, and trains.

Animals are sometimes kept in pet carriers for extended periods of time. When transporting an animal in a private vehicle, the pet owner may choose to keep the animal in the pet carrier if the animal has a tendency to wander about the vehicle. An unrestrained animal may lodge itself in hard to reach or unsafe places, or distract the operator of the vehicle. When traveling in a public transportation vehicle, for the safety of the other passengers and for the safety of the animal, the pet owner may be required to keep the animal in the pet carrier for the duration of the trip. In addition, at certain destinations, such as a veterinarian's office, the pet owner may be required to keep the animal in the pet carrier even after arriving.

Being confined in a pet carrier, even for a short duration, can be a disquieting experience for many animals. Particularly on long trips, animals can become anxious and unsettled within the pet carrier. Often, however, the reassuring touch of the pet owner's hand can calm the animal. As a result, pet owners often desire to insert a hand into the pet carrier to provide assurance to the animal. In addition to calming the animal, a pet owner may also desire to insert a hand into the pet carrier to feed the animal or arrange other items in the pet carrier, such as an animal toy or blanket.

Prior art pet carriers generally include access doors that provide access to the interior space of the carriers to allow the pet owner to place the animal into, and remove the animal from, the pet carrier. Typical access doors include doors composed of rigid wire crossed bars, or flap-covered openings secured by a zipper. Such access doors allow the pet owner to insert their hand into the pet carrier. When such access doors are opened to allow access to the interior of the carrier, however, they may also permit the animal to escape from the pet carrier. Depending on the animal's surroundings, an escaped pet could pose a hazard to itself, other animals, or persons in the immediate vicinity. For example, in a car, an unrestrained animal could distract the driver and cause a collision. In a veterinarian's office, an unrestrained animal could come into contact with, and potentially injure other animals, or be injured by other animals. In an open location, the pet could escape from the area and desert the pet owner.

In addition to an access door, many pet carriers also have small holes in the sides of the carrier. The small holes are generally designed to provide ventilation for the animal and only provide limited access to the interior of the pet carrier. Such holes are generally only large enough to allow a pet owner to insert one or two fingers into the carrier. Accordingly, access to the interior of the pet carrier through the ventilation holes is usually quite limited. Oftentimes, if the animal is positioned away from one side of the carrier, the pet owner will not be able to reach the animal through the ventilation holes on that side.

Providing an open hole in the exterior of a pet carrier which is large enough to allow a pet owner to insert a hand into the pet carrier, but also small enough to prevent an animal from escaping, is not a practical option. Most pet carriers are intended to be used for animals in a wide range of shapes and sizes. Moreover, the size of a given animal will change as it ages from new-born to adult. Therefore, a portal that might be small enough to prevent one animal from escaping might be large enough to allow another animal, or the same animal earlier in its life cycle, to escape from the carrier. In addition, because animals, and particularly cats, can squeeze through small holes, an open hole in a pet carrier intended for pets of various sizes would have to be limited to a very small size, such as the ventilation holes described above. A hole of that size would not be large enough to permit a pet owner to insert a hand into the carrier. A further complicating factor that would need to be taken into account is that different pet owners have different sized hands and therefore a hole that is large enough for some pet owners' hands may be too small for other pet owners.

Some pet carriers that are constructed from flexible materials, such as canvas, have one or more openings that may be closed with a zipper or a draw-string. Closing a portal with a zipper or a draw-string, however, will not prevent the animal from escaping when the portal is opened. Although both a zipper and a draw-string can be used to limit the portal to a size that is only slightly larger than the pet owner's hand, the zipper or draw-string could inadvertently be opened too far, allowing the animal to escape from the pet carrier. In addition, a zipper is particularly dangerous for pets with fur because the animal's fur may catch in the zipper when the zipper is closed.

SUMMARY OF THE INVENTION

According to an exemplary embodiment of the present invention, a pet carrier is provided with an access portal that allows a pet owner to insert a hand into the pet carrier without allowing the pet to escape from the pet carrier.

In another exemplary embodiment of the present invention, a pet carrier includes an access portal that allows a pet owner to insert a hand into the pet carrier and automatically closes when the pet owner removes his/her hand from the interior of the pet carrier.

In a further exemplary embodiment of the present invention, a pet carrier includes an access portal that allows a pet owner to insert a hand into the pet carrier, regardless of the size of the pet owner's hand, and prevents the pet from escaping from the carrier, regardless of the size or type of pet.

In another exemplary embodiment of the present invention, a pet carrier includes an access portal that does not catch an animal's fur when the portal is closed.

In a further embodiment of the present invention, a pet carrier is provided with an access portal in one of the walls of the carrier. The hole can be covered with an elastic material that is attached to the edge of the hole or the wall of the carrier. An aperture can be provided in the elastic material and the elastic material stretches to allow a pet owner to insert a hand into the pet carrier. When the pet owner removes his/her hand from the pet carrier, the elastic material returns to its original state and thereby forms a barrier that prevents the animal from exiting the pet carrier.

BRIEF DESCRIPTION OF THE DRAWINGS

FIG. 1 is a diagram showing a pet carrier with an access portal in a side wall of the pet carrier according to an exemplary embodiment of the present invention.

FIG. 2 is a diagram showing an enlarged view of the access portal shown in FIG. 1.

FIG. 7a is a diagram of a gasket according to an exemplary embodiment of the present invention.

FIG. 7b is a cut-away view of the gasket shown in FIG. 7a.

FIG. 7c is a perspective view of the gasket shown in FIG. 7a.

FIG. 8a is a diagram of a gasket according to an exemplary embodiment of the present invention.

FIG. 8b is a cut-away view of the gasket shown in FIG. 8a.

FIG. 8c is a perspective view of the gasket shown in FIG. 8a.

DETAILED DESCRIPTION

Figure 3:
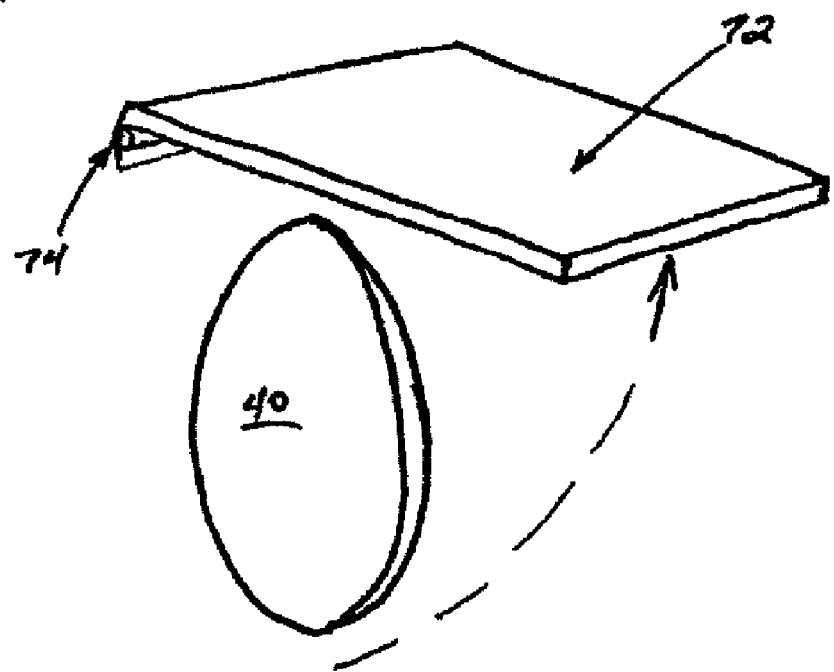
FIG. 3 is a diagram showing an access portal with a door that opens along an axis parallel to a wall of the carrier according to an exemplary embodiment of the present invention.

FIG. 1 shows a pet carrier (10) made of, for example, plastic. Other suitable, inflexible materials could be used for the pet carrier (10). The pet carrier (10) has, for example, a top wall (14), a front wall (18), a door (30) in the front wall (18), two side walls (16), a back wall (not shown), and a bottom (not shown). A handle (19) can be attached to the top wall (14). Ventilation holes (12) may be provided in the side wall (16), in the top wall (14) and/or in the back wall.

The door (30) allows the pet owner to insert an animal into the pet carrier (10) and remove the animal from the pet carrier (10). The door (30) can swing out, away from the interior of the pet carrier (10) and does not have to enter the interior of the pet carrier (10). The door (30) typically includes crossed bars made from, for example, rigid wire or plastic.

An access portal (40) can be located in any of the walls of the pet carrier (10). In a preferred exemplary embodiment, the access portal (40) can be located in one of the side walls (16). As shown in FIG. 2, the access portal (40) has an interior edge (52). In addition, an elastic barrier (54) can cover all or substantially all of the access portal (54). Preferably, the elastic barrier (54) is connected to the interior edge (52) of the access portal (40) or to the interior surface of the side wall (16) of the pet carrier (10). The elastic barrier (54) can contact all or substantially all of the interior edge (52) of the access portal (40). The elastic barrier (54) may have an aperture (56) that is a slit, multiple intersecting slits, a hole, or other suitable design. The aperture (56) preferably does not extend to the interior edge (52) of the access portal (40).

When not stretched, the elastic barrier (54) may lie in a flat plane. Alternatively, the elastic barrier (54) may protrude into or out of the pet carrier (10). The elastic barrier (54) may be made of an elastic material such as rubber, neoprene, polypropylene or any other material that provides sufficient elasticity. The elastic barrier (54) is preferably thick enough to resist tears when it is stretched or when it is scratched by an animal's claws. The elastic barrier (54) is also preferably thick enough to restrict the animal's ability to pass through the access portal (40).

A pet owner can access the interior of the pet carrier (10) by pressing the ends of the fingers of one hand against the elastic barrier (54), in the vicinity of the aperture (56). The elastic barrier (54) stretches and the aperture (56) widens to allow the pet owner's hand to enter the pet carrier (10) through the portal (40). When the pet owner's hand extends into the pet carrier (10), the elastic barrier (54) forms a seal around the pet owner's wrist or forearm, depending upon how far the pet owner's hand is inserted into the pet carrier (10), and prevents the animal from exiting through the access portal (40).

When the hand is removed from the pet carrier (10) by pulling it back through the access portal (40), the elastic barrier (54) may revert back to its original, pre-stretched position, blocking the access portal (40) as shown in FIG. 2. Unlike portals that are closed with zippers, the elastic material that closes the access portal (40) is unlikely to catch an animal's fur, and poses a minimal threat to the safety of the animal. In addition, because the elastic barrier (54) conforms to the shape of the hand as it is withdrawn, the elastic barrier (54) prevents the animal from inserting a leg or its head through the access portal (40).

In another exemplary embodiment, shown in FIG. 3, a door (72) covers the access portal (40). The door (72) may be any shape but preferably it is large enough to cover all or substantially all of the access portal (40). The door may be on the outside or on the inside of the pet carrier (10). The door can be attached to the pet carrier by a hinge (74) that is preferably installed on the interior surface of one of the side walls (16) of the pet carrier (10). The hinge allows the door (72) to swing away from the wall and open the portal (40). As shown in FIG. 3, the door (72) can swing into the pet carrier about an axis parallel to the side wall (16) of the pet carrier (10). The hinge (74) may include a spring that forces the door closed when it is not being held open by the pet owner. Keeping the door closed when the pet owner's hand or arm is not inserted through the access portal (40) ensures that the animal will not be able to escape through the access portal (40).

Figure 14:
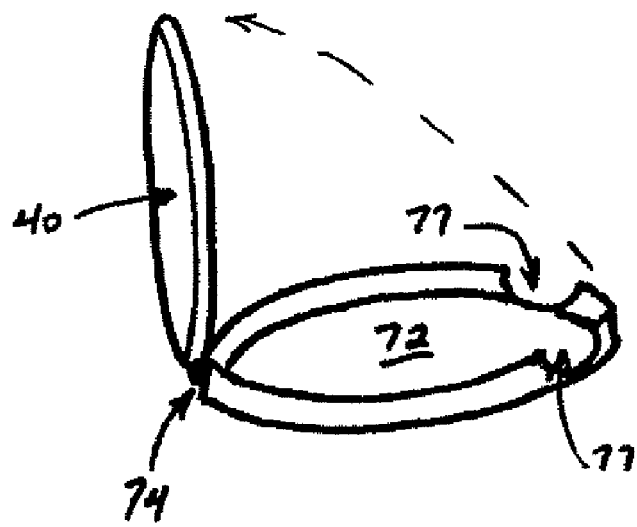
FIG. 14 is a diagram showing an access portal with a door having fingerlet cutouts according to an exemplary embodiment of the present invention.
Figure 15:
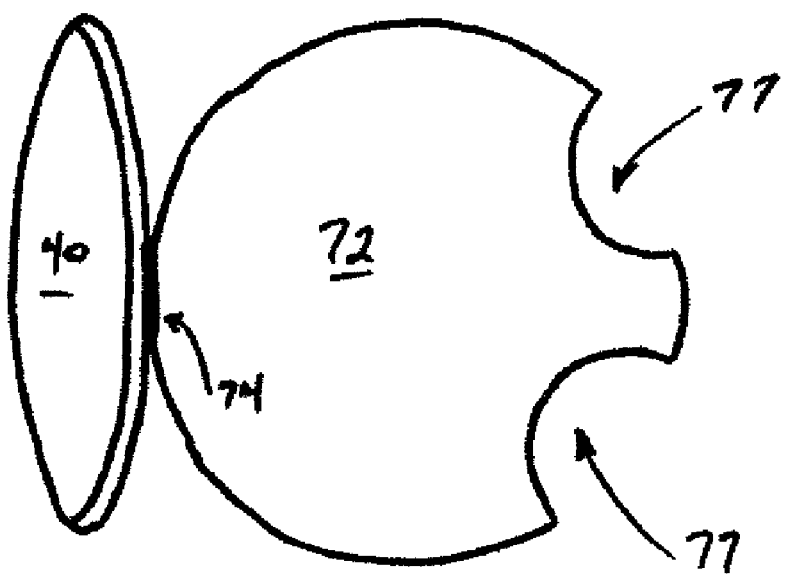
FIG. 15 is a diagram showing an access portal with a door having fingerlet cutouts according to an exemplary embodiment of the present invention.

In addition, as shown in FIGS. 14 and 15, the door (72) may have one or more fingerlet cutouts (77) that allow the pet owner to pull the door (72) closed as the pet owner's hand is removed from the interior of the pet carrier. The fingerlet cutouts (77) may be indentations at the edge of the door (72), or may be holes closer to the center of the door (72). Alternatively, the side of the door (72) facing the access portal (40) may have a tab or other means that allow the pet owner to pull the door closed when the hand is removed. Pulling the door (72) closed as the hand is removed ensures that the pet owner's hand or arm is blocking the access portal (40) during the action of removal, and thereby minimizes the possibility that the animal can escape through the access portal (40). A locking mechanism such as a latch (not shown) may be used to secure the door (72) to the wall of the pet carrier (10) when the door (72) is closed.

Figure 4:
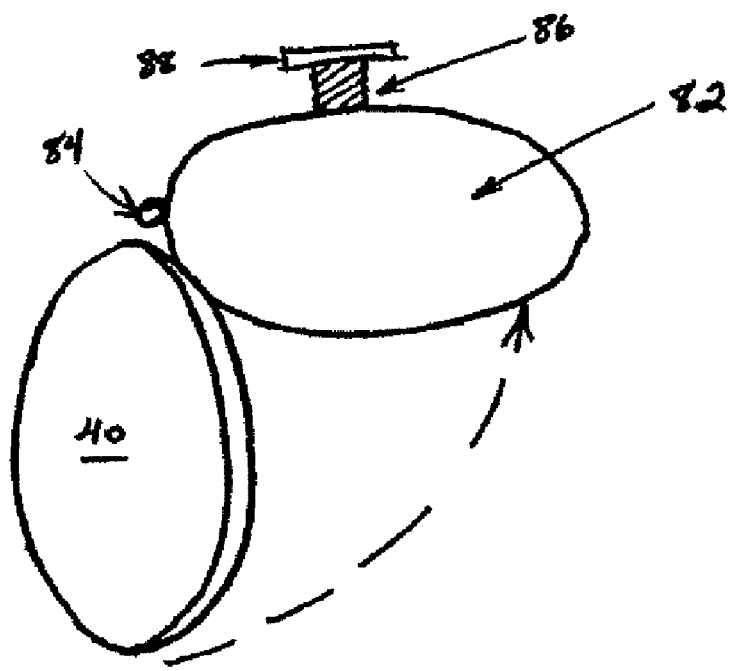
FIG. 4 is a diagram showing an access portal with a door that swings to the side of the access portal according to an exemplary embodiment of the present invention.

In an alternative exemplary embodiment shown in FIG. 4, the door (82) may be connected by a pin (84) or similar means of attachment to the side wall (16). The door (82) rotates about an axis substantially perpendicular to the side wall (16). Preferably, the pin (84) includes a spring mechanism that forces the door (82) closed when it is not being held open by the pet owner. In an alternative exemplary embodiment, as shown in FIG. 4, a spring (86) may also be attached to the side of the door (82). The spring engages a stationary ledge (88) attached to the side wall (16) of the pet carrier (10) and forces the door (82) closed when it is not being held open by the pet owner. In another exemplary embodiment, the spring (86) may be attached to the ledge (88) and positioned so that it engages the door (82) when it is opened. A locking mechanism such as a latch (not shown) may be used to secure the door (82) to the wall of the pet carrier (10) when the door (82) is closed.

The embodiment of the access portal (40) with elastic barrier (54) as shown in FIG. 2 may be combined with the doors (72, 82) disclosed in FIGS. 3, 4, 14 and 15. The doors disclosed in FIGS. 3-4 may be positioned on the inside or outside of the pet carrier (10).

Figure 5:
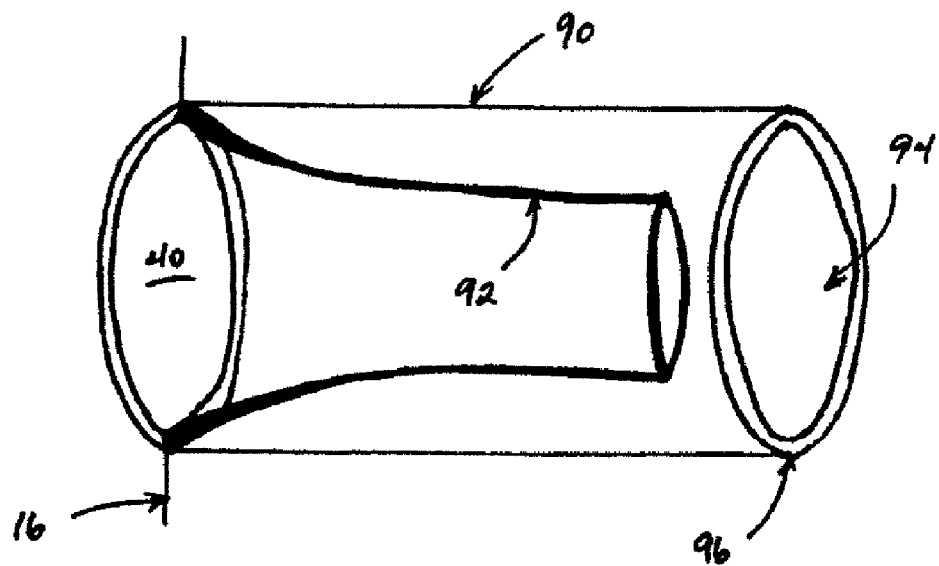
FIG. 5 is a diagram showing a tunnel protruding into the interior of the pet carrier and containing a sleeve therein according to an exemplary embodiment of the present invention.

As an alternate exemplary embodiment, as shown in FIG. 5, the pet carrier (10) may have a short tunnel (90) that extends from the access portal (40) in the side wall (16) of the pet carrier (10), into the interior of the pet carrier (10). The tunnel (90) further restricts an animal's ability to escape from the pet carrier (10) through the access portal (40). The elastic barrier (54) described above (including the aperture (56)) may cover the access portal (40), may cover the opening (94) at the interior end (96) of the tunnel (90), or may be attached to the inner surface of the tunnel (90) anywhere between the access portal (40) and the interior end (96).

Alternatively, an elastic sleeve (92) may be attached to the interior edge of the access portal (40). The elastic sleeve (92) can be initially contained within the tunnel (90). To access the interior of the pet carrier (10), the pet owner would insert a hand and forearm through the elastic sleeve (92) and then through the tunnel (90) to the opening (94) at the interior end (96). To remove the hand from the interior of the pet carrier (10), the pet owner would pull the hand back through the tunnel (90). The elastic sleeve (92) would, for example, be pulled out of the tunnel (90) when the pet owner removes the hand from the tunnel (90). Once the hand is removed from the elastic sleeve (92), however, the elastic sleeve (92) can be replaced in the tunnel (90).

The doors (72, 82) shown in FIGS. 3 and 4 may be placed at either end of the tunnel or at both ends of the tunnel (90). If the door (72) in FIG. 3 is used to cover the opening (94) at the interior end (96) of the tunnel (90), the door (72) would swing into the pet carrier (10). Alternatively, the doors (72) shown in FIGS. 14 and 15 may be placed at the interior end (96) of the tunnel (90) and would swing into the pet carrier (90).

Figure 6:
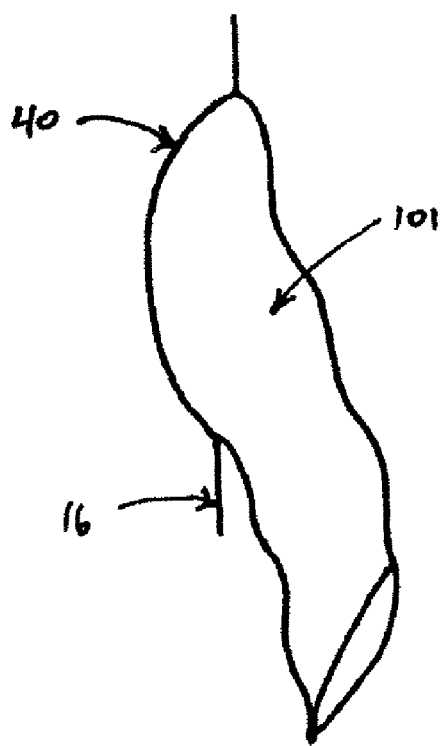
FIG. 6 is a diagram showing an access portal with a flexible sleeve according to an exemplary embodiment of the present invention.

As an alternate exemplary embodiment, as shown in FIG. 6, a flexible sleeve (101) may be attached to the interior edge (52) of the access portal (40) or to a side wall (16) of the pet carrier (10). The flexible sleeve (101) can be made from materials such as canvas, nylon, or cotton.

To access the interior of the pet carrier (10), the pet owner would insert a hand and forearm through the access portal (40) and through the flexible sleeve (101). To remove the hand from the interior of the pet carrier (10), the pet owner would pull the hand back through the access portal (40). The flexible sleeve (101) would be pulled out of the pet carrier (10) when the pet owner removes the hand. Once the hand is removed from the flexible sleeve (101), however, the flexible sleeve (101) can be replaced in the pet carrier (10). Preferably the sleeve (101) would be thick enough, and constructed from a material that is strong enough, to resist tearing.

Figure 11A:
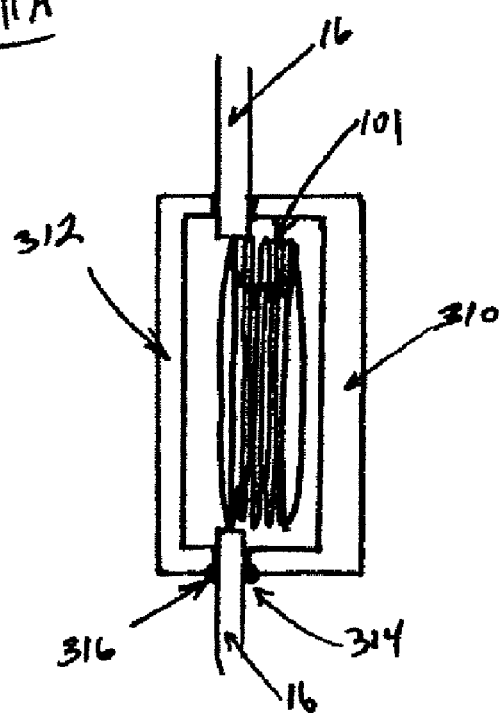
FIG. 11A is a diagram showing an access portal with a flexible sleeve and two doors according to an exemplary embodiment of the present invention.
Figure 11B:
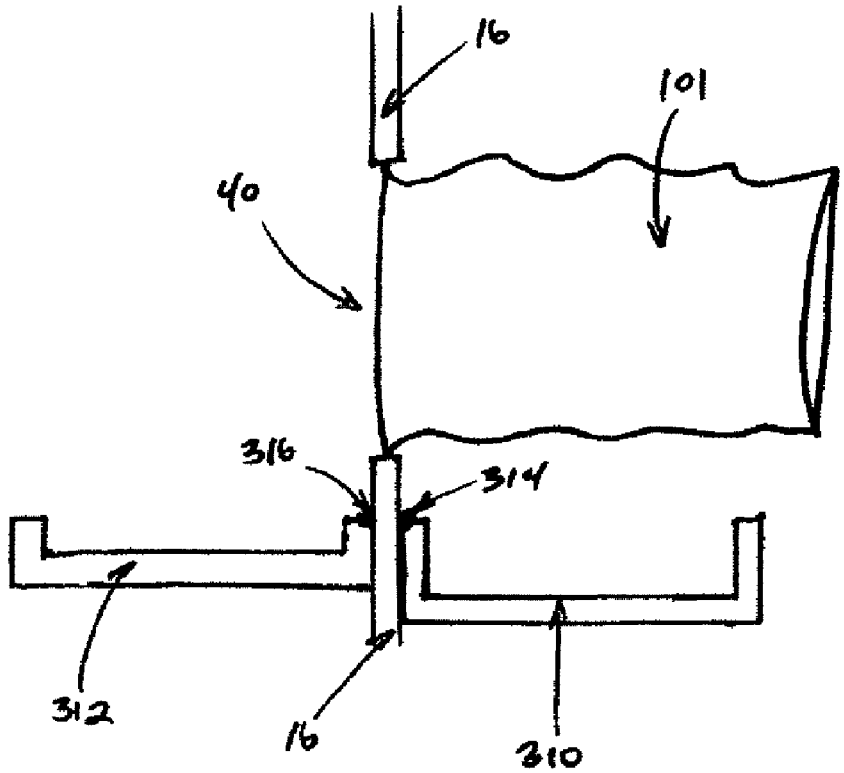
FIG. 11B is a diagram showing an access portal with a flexible sleeve and two open doors according to an exemplary embodiment of the present invention.

In addition, as shown in FIGS. 11A and 11B, an outer door (312) and an inner door (310) may also be used to close the access portal (40). The doors (310, 312) may be concave with a hollow indentation on the side of the door facing the access portal (40). The doors (310, 312) could enclose the sleeve (101) when they are closed. To fit the sleeve (101) between the doors (310, 312) and to allow the doors (310, 312) to fully close, the sleeve (101) may be collapsed or folded to conserve space. The doors (310, 312) may be connected to the wall (16) of the carrier by hinges (314, 316). The hinges may be attached to the lower edge of the doors (310, 312) and also may be attached to the wall (16) of the carrier below the access portal (40). To access the interior of the pet carrier, the pet owner would, for example, first open the outer door (312) and insert a hand at least part of the way into the sleeve (101). The pet owner would then open the inner door (310) and insert the hand into the interior of the carrier. As the pet owner inserts the hand into the carrier, the sleeve (101) would surround the pet owner's hand and/or forearm. To remove the hand from the carrier, the pet owner would reach for the inner door (310) with the hand that is inside the carrier. The inner door (310) may have fingerlet cutouts, indentations, a latch or a similar structure or structures that would allow the pet owner to more easily pull the inner door (310) towards the access portal (40). Alternatively, the inner door may (310) be attached to the sleeve (101) and the sleeve may draw the inner door (310) closed as the pet owner removes the hand from the pet carrier. Once the inner door (310) is closed, the pet owner can remove the hand from the sleeve (101). The sleeve (101) can then be collapsed or folded to fit in between the inner door (310) and the outer door (312) and the outer door (312) may be closed.

Figure 7D:
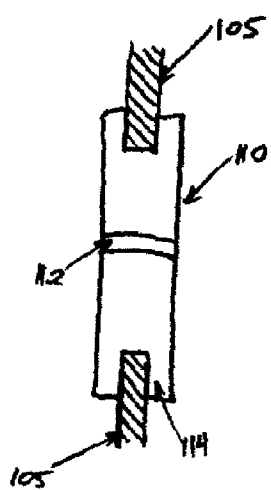
FIG. 7d is a diagram of the gasket shown in FIG. 7a as it would appear if installed in a portal.
Figure 8D:
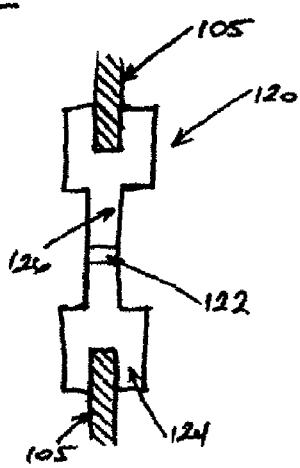
FIG. 8d is a diagram of the gasket shown in FIG. 8a as it would appear if installed in a portal.
Figure 7E:
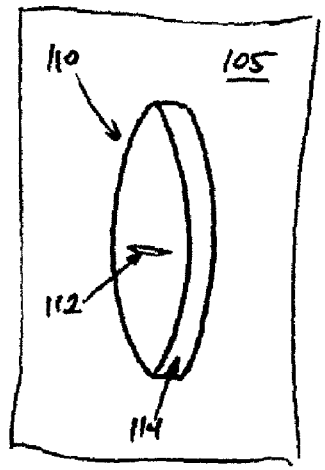
FIG. 7e is a perspective view of the gasket shown in FIG. 7a as it would appear if it were installed in a portal.

In another exemplary embodiment, shown in FIGS. 7a-7e, a gasket (110) is, for example, formed from an elastic material and has two outer portions (114) that are joined to a center portion (116). An aperture (112) runs through each portion—from the outer surface (115) of one of the outer portions (114), through the center portion (116), and to the outer surface (115) of the other outer portion (114). As shown in FIGS. 7d-7e, the gasket (110) may be placed in an open access portal in a pet carrier (10) and fixedly attached to a wall (105) of the pet carrier. Preferably, the gasket could be positioned so that one of the outer portions (114) is outside of the carrier (as shown in FIG. 7e), the other outer portion (114) is inside the carrier, and the center portion (116) lies in the same plane as the wall (105). The inner surfaces (117) of the outer portions (114) could be attached to the wall (105) by glue or other suitable means.

If a gasket as shown in FIGS. 7a-7e is installed in an access portal (40) of a pet carrier, (10), a pet owner could access the interior of the pet carrier (10) by pressing the ends of the fingers of one hand against the outer portion (114) of the gasket (110), in the vicinity of the aperture (112). The elastic material of the gasket would stretch and the aperture (112) would widen to allow the pet owner's hand to enter the pet carrier (10) through the portal (40). When the pet owner's hand extends into the pet carrier (10), the elastic material of the gasket (110) forms a seal around the pet owner's wrist or forearm, depending upon how far the pet owner's hand is inserted into the pet carrier (10), and prevents the animal from exiting through the access portal (40).

When the hand is removed from the pet carrier (10) by pulling it back through the access portal (40), the gasket (110) reverts back to its original, pre-stretched position, blocking the access portal (40). Because the gasket (110) conforms to the shape of the hand as it is withdrawn, an animal would be prevented from inserting a leg or its head through the access portal (40).

Figure 8E:
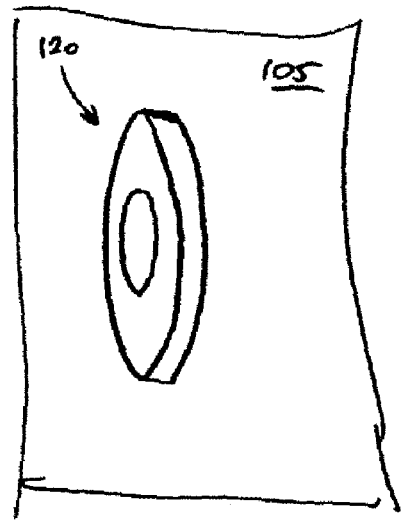
FIG. 8e is a perspective view of the gasket shown in FIG. 8a as it would appear if it were installed in a portal.

FIGS. 8a-8e show an alternative exemplary embodiment for a gasket (120). The gasket (120) may have two outer portions (124) that are joined to a center portion (126). An aperture (112) could run through the center portion (126). The difference between the gasket (110) depicted in FIGS. 7a-7e and the gasket (120) depicted in FIGS. 8a-8e is that the outer portions (124) of the gasket (120) depicted in FIGS. 8a-8e do not completely cover the flat surfaces (125) of the center portion (126). The gasket (120) may be placed in an open access portal in a pet carrier (10) and fixedly attached to a wall (105) of the pet carrier. Preferably, the gasket would be positioned so that one of the outer portions (124) would be outside of the carrier (as shown in FIG. 8e), the other outer portion (124) would be inside the carrier, and the center portion (126) would lie in the same plane as the wall (105). The inner surfaces (127) of the outer portions (124) could be attached to the wall (105) by glue or other suitable means. If the gasket (120) is installed in an access portal, and attached to the side wall of the carrier, it could function in a manner similar to the gasket (110) depicted in FIGS. 7a-7e.

Figure 9:
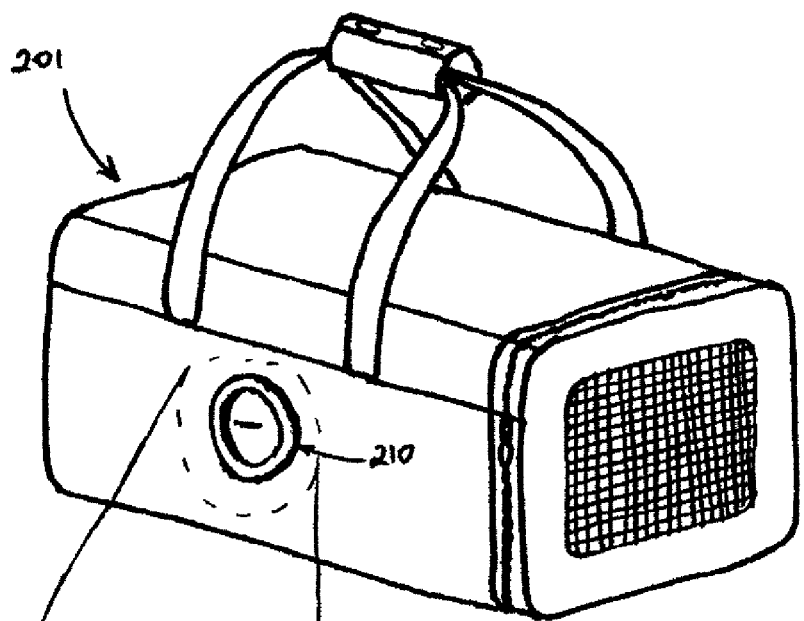
FIG. 9 is a diagram of a pet carrier constructed from a flexible material and having a rigid frame according to an exemplary embodiment of the present invention.
Figure 10:
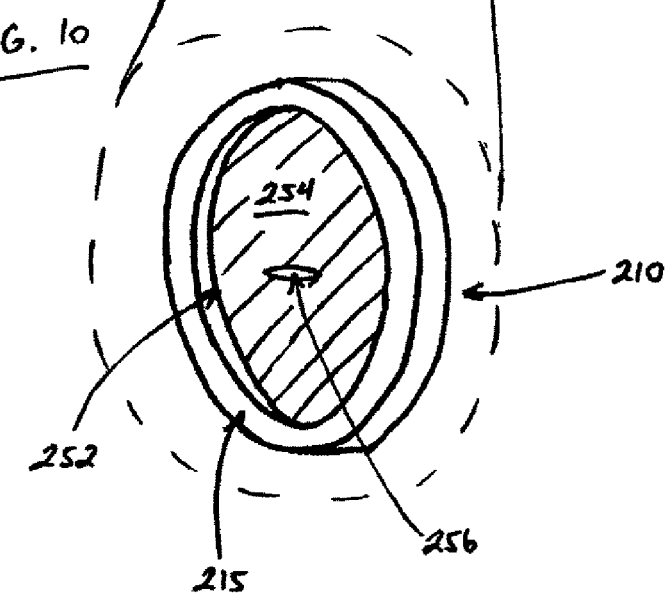
FIG. 10 is a diagram showing an enlarged view of the frame shown in FIG. 9.

As shown in FIGS. 9-10, if the pet carrier (201) is constructed from a flexible material such as canvas, a frame (210) constructed of a rigid material could be installed in the wall of the pet carrier (201). The frame (210) could be made from, for example, metal or plastic, and could extend partly inside the pet carrier (201) and partly outside the pet carrier (201).

The frame (210) could serve the same function as the portion of the wall (16) of the pet carrier (10) immediately surrounding the access portal (40) as shown, for example, in FIGS. 1-2. A frame (210) installed in the pet carrier (201) could be considered part of the wall in which the frame (210) is installed. Therefore, any reference to the walls (16) of the pet carrier (10) or the surface of the walls (16) of the pet carrier (10) could also apply to the frame (210) and the surfaces of the frame (210).

The frame (210) could provide, for example, a rim (215) and an interior edge (252) to which an elastic barrier (254) containing an aperture (256) may be attached. As an alternative embodiment, a gasket such as one of the gaskets (110, 120) shown in FIGS. 7a-7e or FIGS. 8a-8e may be attached to the frame (210). In addition, doors such as the doors (72, 82) shown in FIGS. 3-4 may be attached to the frame (210). A door may be attached to a part of the frame (210) on the outside of the pet carrier (201) and open outward. A door may be attached to a part of the frame (210) on the inside of the carrier and open into the pet carrier (201). Alternatively, a flexible sleeve (101) and/or doors (310,312) as disclosed in FIGS. 6, 11A, and 11B may be attached to the frame (210).

Similarly, if the access portal (40) is inserted in the door (30) of a pet carrier (10) and the door (30) consists of rigid crossed bars made from, for example, metal or plastic, a solid frame could be installed in the door (30) to provide a rim and an interior edge to which the elastic barrier (54), a gasket (110, 120) and/or door(s) (72, 82) may be attached.

Figure 12:
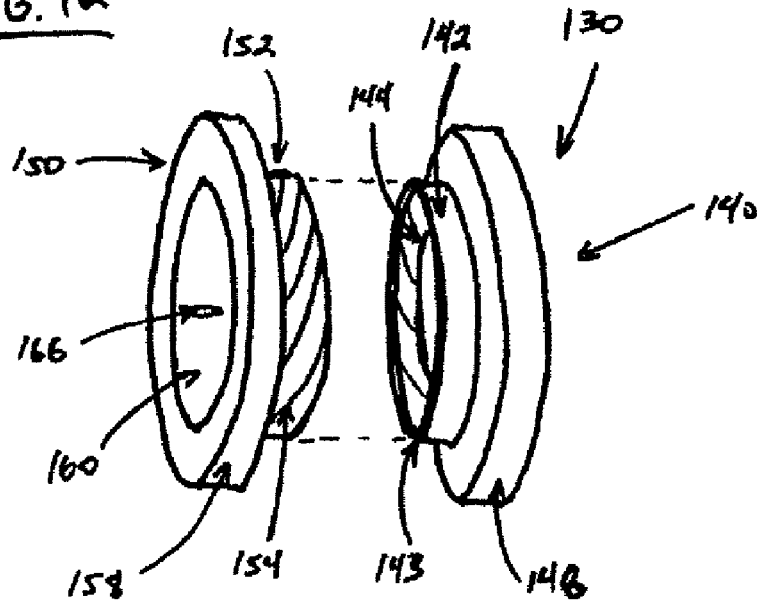
FIG. 12 is a diagram of a device that can be used to install an access portal according to an exemplary embodiment of the present invention.

In another exemplary embodiment as shown in FIG. 12, a device (130) could be used to create an access portal in the wall of a pet carrier (10). The device (130) may comprise two parts. The first part (140) has a hollow first inner section (142) that can have a sharp exposed edge (143). The first inner section (142) also may have screw threads (144) that are preferably on the inner surface of the first inner section (142). The first inner section (142) is connected to a first frame (148) that extends at least partially beyond the outer circumference of the first inner section (142). The first frame (148) may be substantially hollow in the area bounded by the points where the first frame (148) and the first inner section (142) are joined.

The device (130) may further have a second part (150). The second part (150) also may have a second inner section (152). The second inner section may have screw threads (154) that would be preferably on the outer surface of the second inner section (152). The outer diameter of the second inner section (152) would preferably be sized such that the screw threads (154) of the second inner section (152) could engage the screw threads (144) of the first inner section (142) if the two inner sections were adjoining. The second inner section (152) may be connected to a second frame (158) that extends at least partially beyond the outer circumference of the second inner section (152). The second frame (158) may be substantially hollow in the area bounded by the points where the second frame (158) and the second inner section (152) are joined.

As shown in FIG. 12, an elastic barrier (160) can cover all or substantially all of the hollow center of the second frame (158). The elastic barrier (160) would be attached to the frame (158). The elastic barrier (160) would have an aperture (166) that is a slit, multiple intersecting slits, a hole, or other suitable design. The aperture (166) preferably does not extend to the frame (158). In addition to, or instead of, the elastic barrier (160) covering the hollow center of the second frame (158), an elastic barrier may also be attached to, and cover all or substantially all of the hollow center of, the first frame (148). An elastic barrier attached to the second frame (158) would also have an aperture as described above.

Figure 13:
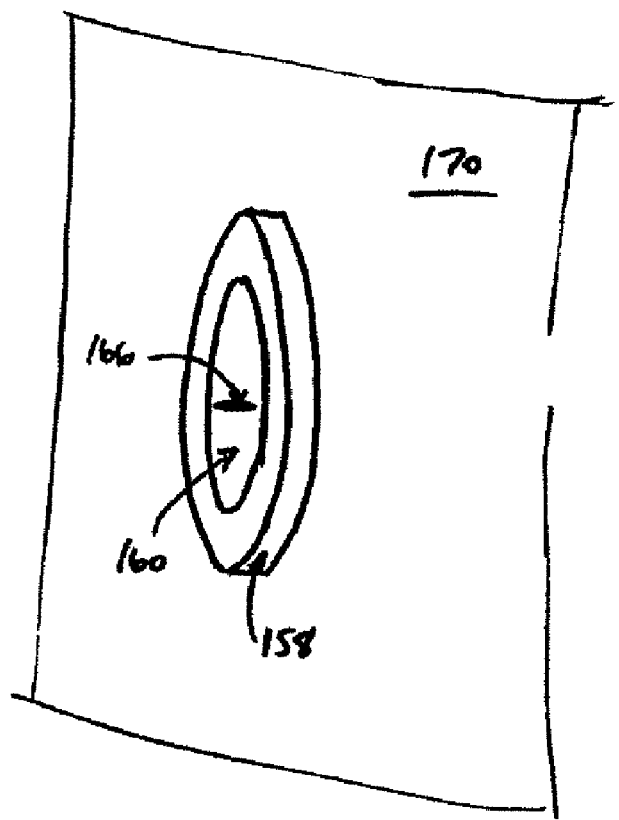
FIG. 13 is a diagram of the device shown in FIG. 9 after it is installed in a carrier wall, as seen from the outside the carrier.

The sharp edge (143) of the first inner section may be used to cut a hole in the wall of a carrier (10). The first inner section (142) and the second inner section (152) could be inserted in the hole and joined by the screw threads (144, 154). As shown in FIG. 13, preferably only the second frame (158) would be outside the carrier wall (170) when the device (130) is installed. Because the frames (148, 158) extend beyond the outer circumference of the inner sections (142, 152) they would prevent the device (130) from dislodging from the hole. A pet owner could then insert a hand into the pet carrier (10) through the aperture (166) in the elastic barrier (160). The hand could pass through the center of the second frame (158), through the center of the second inner section (152) (which could be encircled by the first inner section (142)), and through the center of the first frame (148). Also, if the second inner section (152) is inserted into the first inner section (142), the sharp edge (143) of the first inner section (142) would not be exposed to the hollow center of the second inner section (152), thereby protecting the pet owner's hand when it passes through.

The two parts of the device (130) may also be joined by means other than the screw threads (144, 154). The parts may be joined by glue, welding, latching, or other suitable means. In addition, the inner section of one of the parts (142, 152) may be joined to the frame (148, 158) of the other part instead of joining the inner sections (142, 152). Further, the frames (148, 158) can be joined to the wall of the carrier in addition to, or instead of, joining the two parts of the device (130).

Although certain preferred exemplary embodiments of the present invention have been shown and described in detail, it should be understood that various changes and modifications may be made therein without departing from the scope of the appended claims.

What is claimed is:

1. A transport container capable of carrying therein a pet animal from one location to another, comprising: (a) a housing including a first opening and a second opening, the first opening for inserting an animal into, and for removing the animal from, said housing, the second opening having an interior edge and being spaced apart from the first opening; (b) an elastic material of substantially the same size as the second opening, the elastic material being attached to the interior edge of the second opening and physically blocking a substantial portion of the second opening, and the elastic material having an aperture therein; and (c) an attachment connected to the housing for carrying the transport container.

2. The transport container of claim 1, wherein said elastic material includes one of neoprene, rubber, and nylon.

3. The transport container of claim 1, wherein the second opening is located in a side wall of said housing.

4. The transport container of claim 1, wherein the attachment is a handle.

* * * * *